Figure 8:
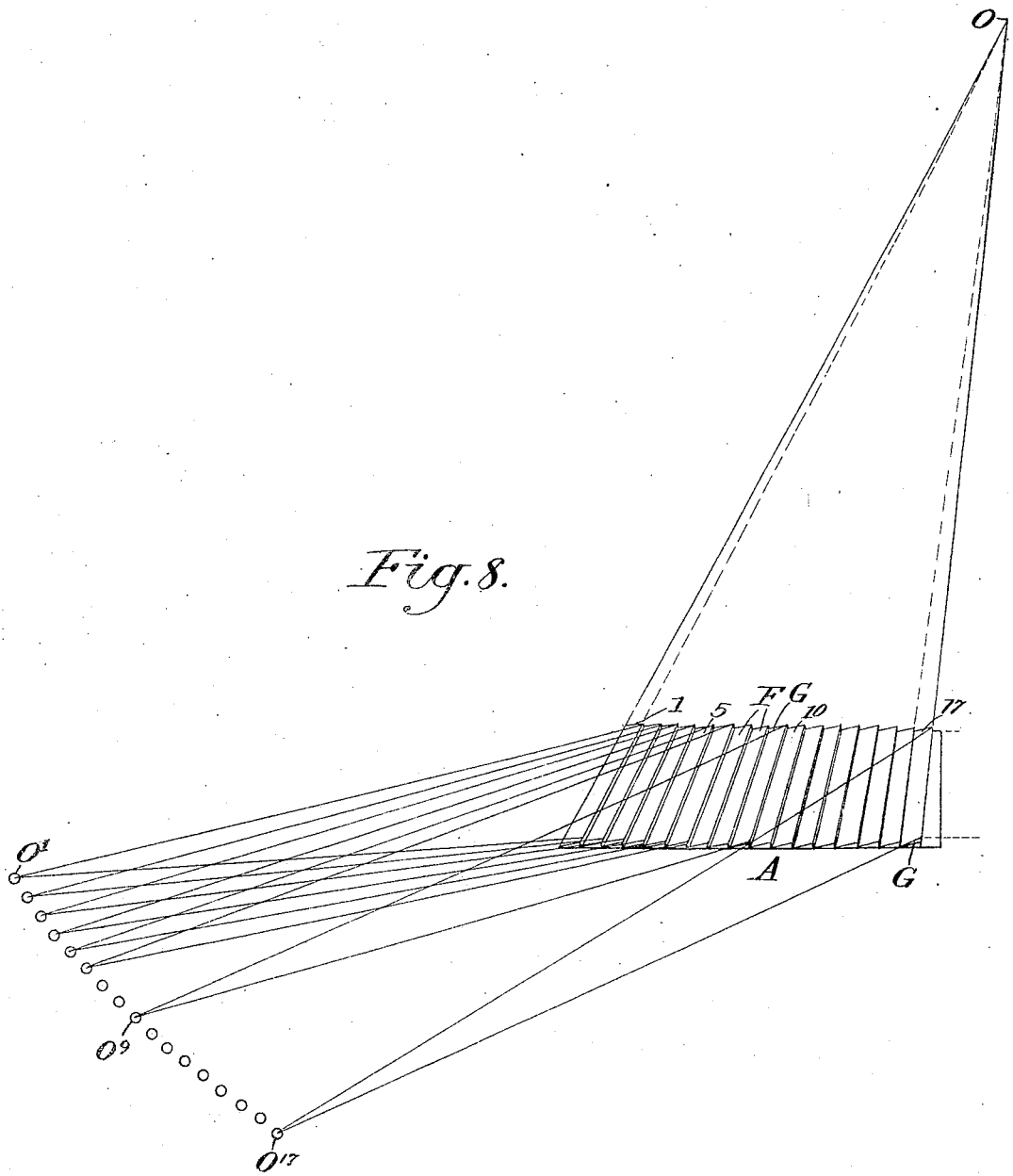

C. L. McKESSON & B. F. RICE.
METHOD AND APPARATUS FOR SIZING OR VOLUMETRIC GRADING OF MATERIALS.
APPLICATION FILED JUNE 1, 1912.
1,044,067.
Patented Nov. 12, 1912.
8 SHEETS—SHEET 1.
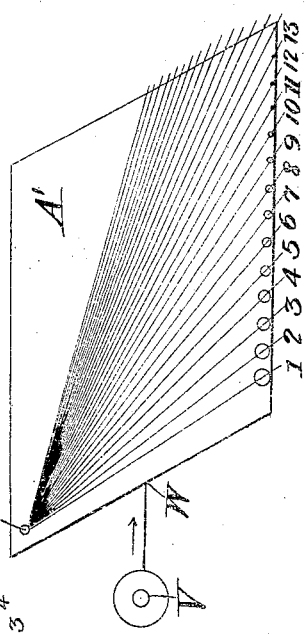
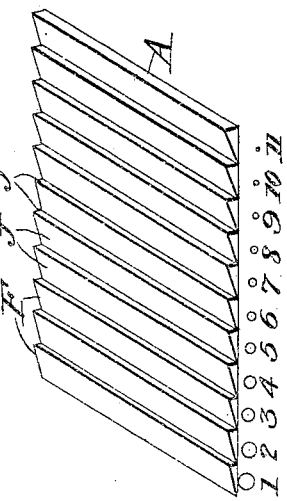
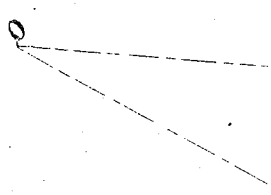
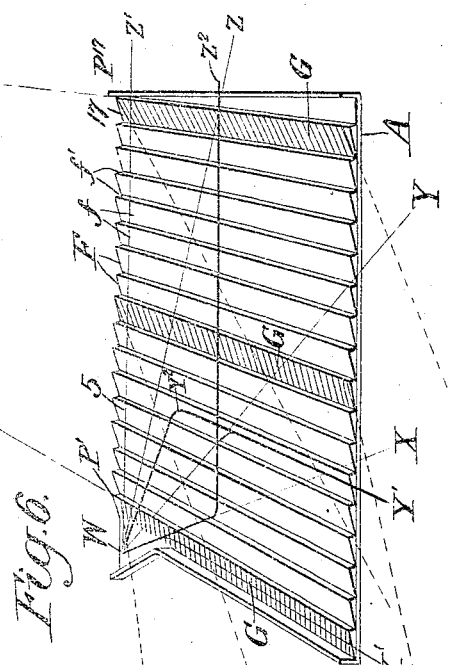
Witnesses.
Helen S. Morris
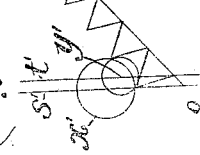
Inventors.

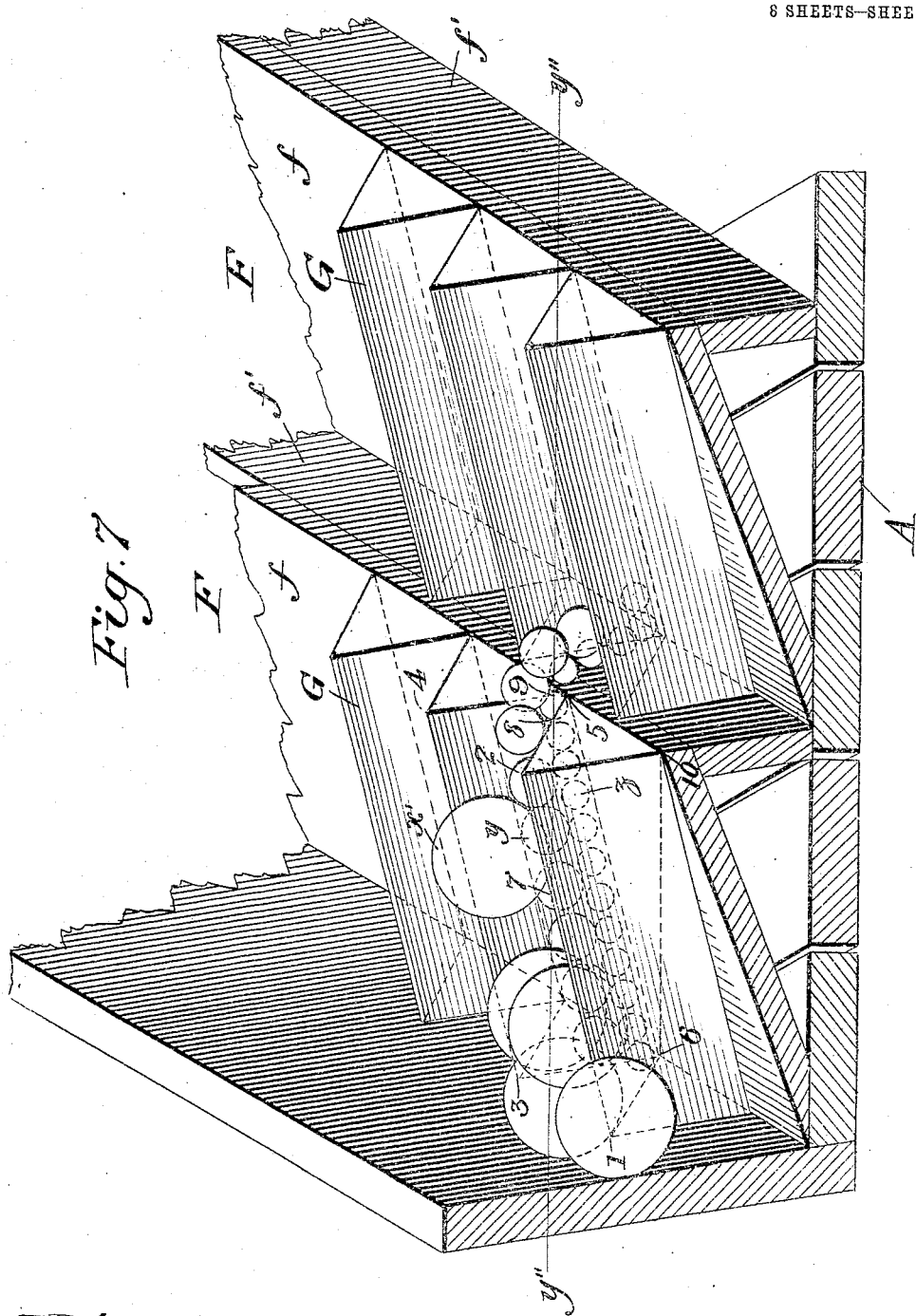

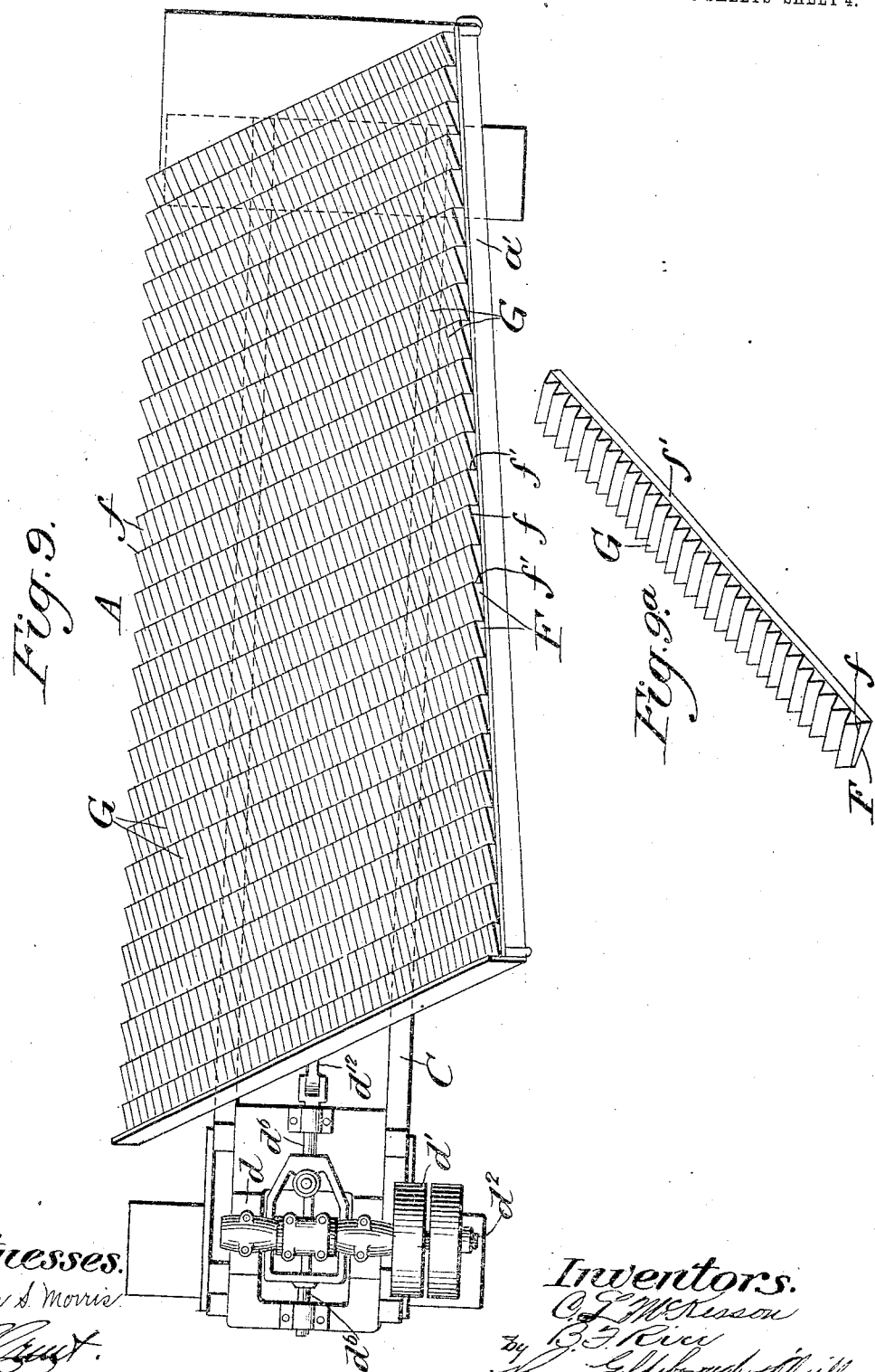

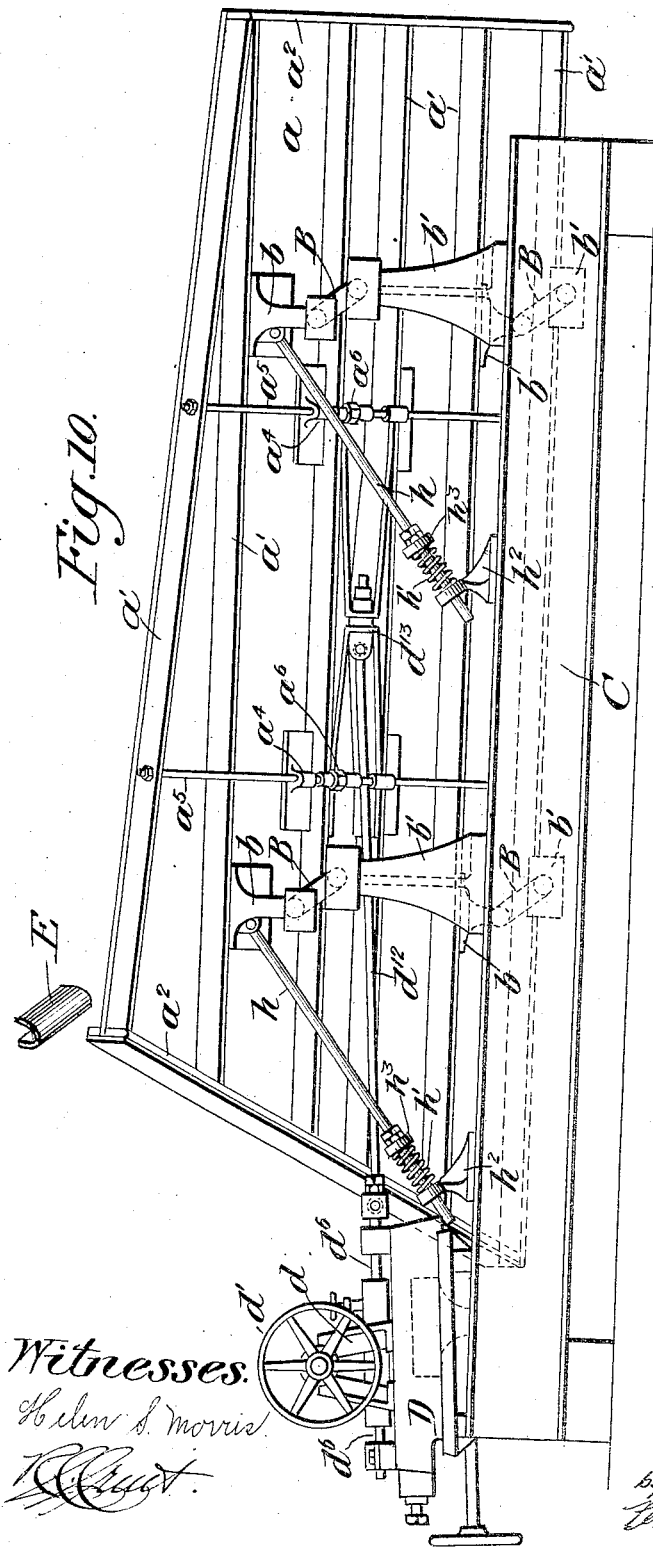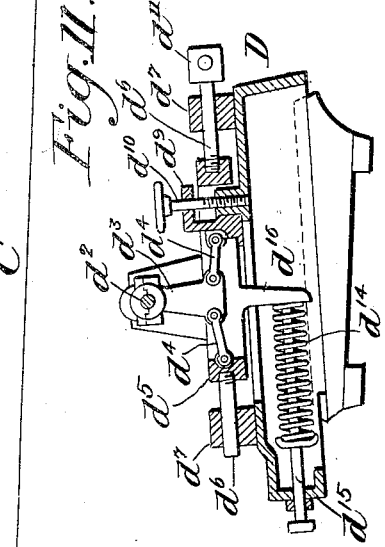

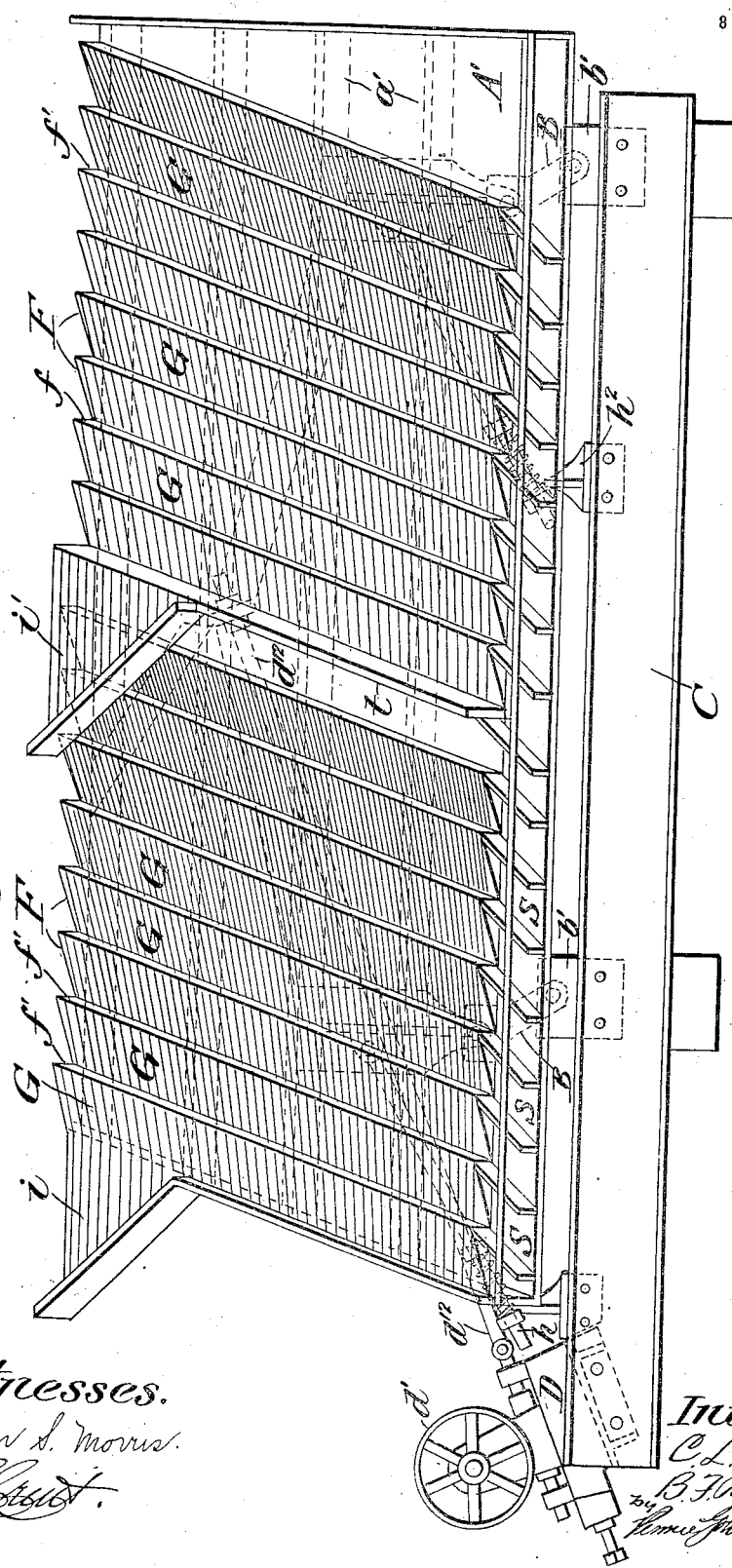

C. L. McKESSON & B. F. RICE.
METHOD AND APPARATUS FOR SIZING OR VOLUMETRIC GRADING OF MATERIALS.
APPLICATION FILED JUNE 1, 1912.
1,044,067.
Patented Nov. 12, 1912.
8 SHEETS—SHEET 7.
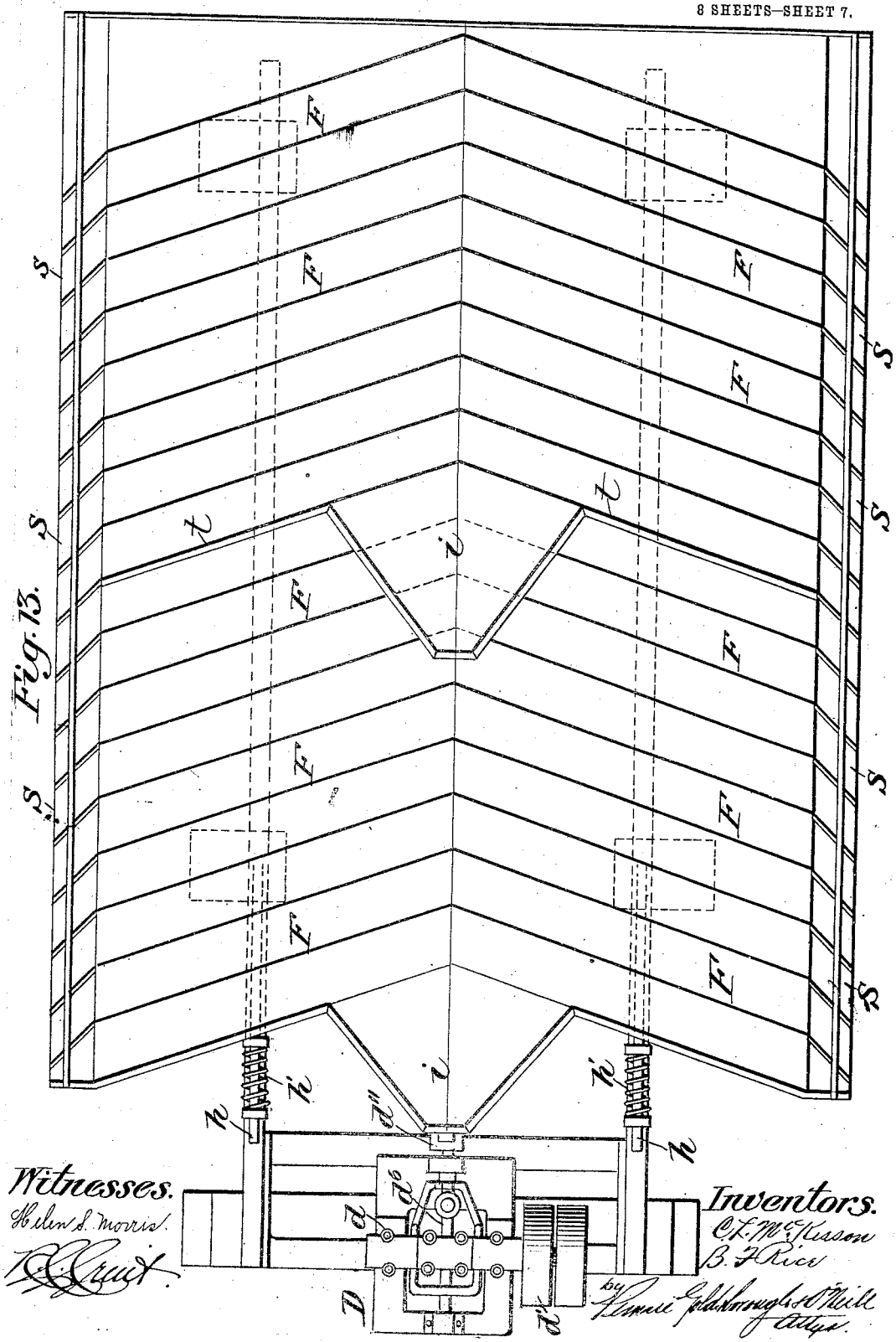

C. L. McKESSON & B. F. RICE.
METHOD AND APPARATUS FOR SIZING OR VOLUMETRIC GRADING OF MATERIALS.
APPLICATION FILED JUNE 1, 1912.

1,044,067.

Patented Nov. 12, 1912.
8 SHEETS—SHEET 8.

Witnesses.

Inventors.

UNITED STATES PATENT OFFICE.

CHARLES L. McKESSON AND BENJAMIN F. RICE, OF COLORADO SPRINGS, COLORADO.

METHOD AND APPARATUS FOR SIZING OR VOLUMETRIC GRADING OF MATERIALS.

1,044,067.  Specification of Letters Patent.  Patented Nov. 12, 1912.

Application filed June 1, 1912. Serial No. 701,003.

*To all whom it may concern:*

Be it known that we, CHARLES L. McKESSON and BENJAMIN F. RICE, both citizens of the United States, and residents of Colorado Springs, county of El Paso, State of Colorado, have invented certain new and useful Improvements in Methods and Apparatus for Sizing or Volumetric Grading of Materials; and we do hereby declare the following to be a full, clear, and exact description of the invention, such as will enable others skilled in the art to which it appertains to make and use the same.

The present invention relates to method and apparatus for grading or sizing solid materials according to the volumes of the different bodies ranging from material in pulverulent form to material comprising sections or pieces of large size, the object being to deliver all materials of whatever nature or character, having the same volume or size, together, without respect to the weights or specific gravities of the respective materials.

As heretofore practised, the art of sizing or grading material according to the respective volumes of the constituents thereof, has been practised by means of screens of varying mesh, or by means of the so-called hydraulic or pneumatic apparatus involving the settling principle, and so far as we are advised, no simple and efficient mechanical means, other than the screens referred to, has ever been devised for effecting an automatic separation and grading of various materials according to the sizes or volumes of the constituent elements and without regard to any difference in weight or specific gravity of the materials being separated or graded. By means of the present invention, however, it is possible to separate a heterogeneous mass of materials in various degrees of subdivision, into separate classes or portions, each class or portion containing all of the heterogeneous materials possessing the same volumetric values, or in the alternative, to separate materials of the same general character into separate classes or portions, each class or portion containing only elements, particles, or grains of the same size, and the several classes or portions in both cases differing from each other only as to the volumes or sizes of the individual elements.

To illustrate by concrete example, it has been found that, by a proper application of the principles upon which the present invention is based, a commercial grading, according to the size or volume may be effected with all kinds of materials, whether separate or in admixture, such as seeds, grain, vegetables, fruits, coal, ores, rock, gravel, sand and salt, and in fact, any and all materials in a state of subdivision. The material advantages of such an operation are obvious, and the invention is also applicable to many and divers arts.

Figure 14:
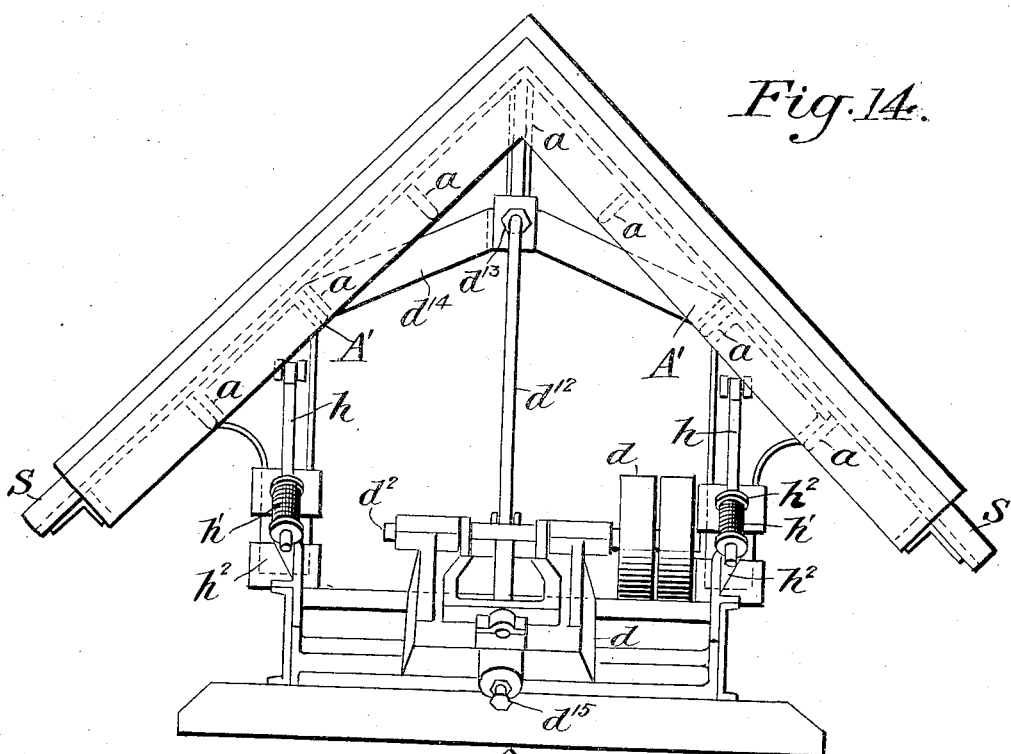
Figure 15:
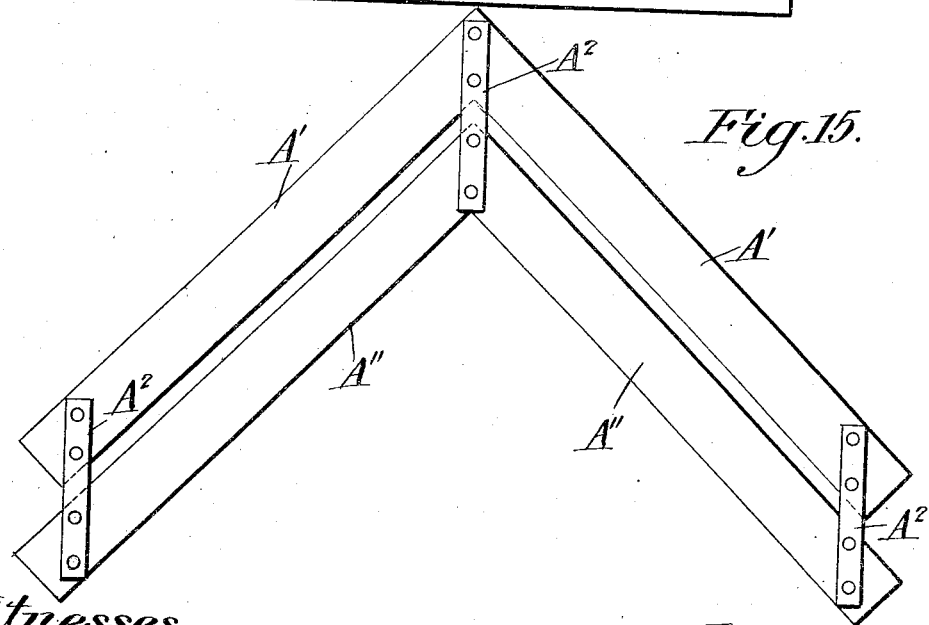

The general principles upon which the invention is based and highly efficient forms of apparatus for putting these principles into effect are illustrated in the accompanying drawings, in which, Figures 1, 2 and 3 are diagrams illustrating some of the fundamental principles. Fig. 4 is a perspective view of a simplified form of apparatus by means of which a more or less effective sizing may be produced. Fig 5 is a diagram illustrating the application of one phase of the invention. Fig. 6 is a side elevation of one form of sizing table involving the invention. Fig. 7 is an enlarged fragmentary perspective view of a sizing table. Fig. 8 is a diagram illustrating one mode of laying out and constructing the elements forming the main deflectors and the supplemental corrugations constituting the sizing surface of the table. Fig. 9 is a plan view of a single surface sizing table. Fig. 9ª is a perspective view of one of the deflectors and its associated corrugations. Fig. 10 is a rear elevation of the table illustrated in Fig. 9. Fig. 11 is a longitudinal section through a simple form of head motion. Fig. 12 is a side elevation of a double surface table. Fig. 13 is a plan view of the same, with the corrugations or ridge-like members omitted. Fig. 14 is an end view of the double surface table, and Fig. 15 is a similar view illustrating the application of superposed double surface tables.

Upon the assumption that an exposition of the broad principles underlying the invention will tend in a large measure to simplify the more specific description of the process and the apparatus involved therein, the following statement is deemed desirable.

It has been found that the substitution of air for water as a medium of separation of materials according to difference of specific gravity, requires a relatively high vecity of the air, as compared with that of water. This is aptly characterized by Dr. Richards, the recognized authority on sizing, in his statement that "the effect of density in water is equivalent to the effect of velocity on air." Consequently the difference in the velocities of particles of the same size but of different specific gravities, in falling through the atmosphere for a distance of say ten to twelve feet, is so extremely slight as to be hardly noticeable and, for all practical purposes, does not exist. There is, however, a decided difference in the velocity of a large particle as compared to a small particle. This may be exemplified by dropping a small quantity of granular material on a smooth inclined surface, and it will be found that the larger particles will roll or slide along the surface faster than the next smaller particles, and so on, to and including the fine dust or granules which will be found to leave the surface last and to move slowest thereover. If the material could be stopped in its course down the incline, an examination would show a regular gradation of particles, according to size, beginning with the coarsest particles at a point farthest down the incline and ending with the fine dust-like particles at the point nearest to where the material was fed to the incline, with the intermediate sizes regularly distributed between these extremes, according to the respective sizes thereof. This principle is exemplified in Fig. 1, in which the line O illustrates an inclined plane upon which particles of varying sizes from 1 to 12 are permitted to slide, and the sliding motion arrested after a predetermined period, when the disposition of the particles will be found to be that indicated, with the largest particles $l$ at the bottom and the smallest particles near the top, in the regular order of the sizes of the respective particles. Assume that the inclined plane upon which the material is dropped is given substantial length and breadth and has imparted to it a differential reciprocating motion, such as will cause the material thereon to be advanced in a generally horizontal direction, at the same time that it is permitted to slide down the plane, and an effect is produced such as diagrammatically illustrated in Fig. 2, in which A′ illustrates the inclined plane provided with means V connected to said plate at W to impart a reciprocating motion to the latter in a longitudinal direction. The material of varying sizes is fed at the point O, located at the high corner of the table A′, at the end opposite to which it would be prop. led by the differential reciprocating motion imparted to said surface, if the latter were acting alone. From an inspection of the diagram, it will be noted that the smaller the piece or particle of the material dropped on the table, the farther said particle will be advanced toward the end of the inclined surface opposite the feed, before leaving said surface, due to the fact that the smaller the piece or particle, the longer it takes to pass down the incline, and consequently, the longer it is subject to the progressive action of the reciprocating motion. As the result, the particles will leave the lower edge of the inclined surface or the lateral inclined edge thereof at different points, and at different intervals of time, as diagrammatically indicated in Fig. 2, the largest particles passing more directly down the incline and discharging over the lower edge first, and the successively smaller particles leaving the lower edge of the table at successively longer intervals of time and at different points 1, 2, 3, 4 to 13, as indicated, while the very small particles will be ultimately discharged over the rear lateral edge of the table.

It has been found that with a deck or surface of sufficient length and breadth, disposed and operated as in the diagram illustrated in Fig. 1, a very fair character of sizing may be accomplished, but the capacity and output of such a table is comparatively low, and it is found that, to an appreciable degree, the specific gravity and general shape of the particles interfere to affect an ultimate grading or sizing of the products.

It is evident that if the first principle enunciated alone were followed, and the material permitted to merely slide down an inclined surface in a substantially straight line, no separation could be accomplished, as the feed would necessarily have to be intermittent, and the products would constantly re-mix after leaving the inclined surface, but by imparting to the surface substantial length and breadth, associated with a differential reciprocation in the direction of its length, a continuous feed of material may be effected, and the different sized particles are carried forward on the surface in direct proportion to the respective times it requires for the separate elements to pass down the direct incline. As the resultant of the influence of gravity and the progressive action of the differential reciprocating motion imparted to the surface A′, illustrated in Fig. 2, the various sized particles will pass over the table in courses conventionally illustrated by the lines $O^1$, $O^2$, $O^3$, etc., in regular order and sequence, the largest particles discharging first in point of time and nearest the feed end of the table, and the finest particles discharging last in point of time and at a point farthest from the feed end of the table.

It is a recognized fact that with granular material, en masse, when subjected to a shaking or reciprocating motion such as will cause the material to be generally agitated, the finer material will report at the bottom of the mass and the coarser at the top. This selective action or stratification is materially accelerated by imparting to the material projecting pulsations, such as will cause the material to be thrown out of contact with the surface upon which it rests and at the same time subjecting the material to a shaking or reciprocating motion. The effect of such an action on divided material *en masse* is very pronounced and very quickly separates the coarse material from entanglement with the finer material, leaving the different size particles or elements free to assume their natural line of travel. This action may be exemplified by placing a conglomerate body of irregular sand, shot, or the like in a glass tube or bottle and shaking the container with an oscillatory and reciprocating movement, when it will be found that the material quickly separates so as to bring the finest material at the bottom and the coarsest material at the top, with the other grades, according to size, regularly disposed between these extremes.

It is evident from the foregoing that if a differential reciprocating motion be imparted to an inclined plane such as A' in Fig. 2, of a character which would not only advance the material in a generally horizontal direction, but would also at the same time, project such material in a generally vertical direction, the separation of the material according to the volumes or sizes of the individual elements composing the same, would be effected more expeditiously and the disentanglement of the coarser and finer materials would be more quickly accomplished. This desired motion of the laterally inclined table A' may be effected by mounting the same upon a series of supporting links which are each secured to a rigid base at the one end and to the inclined surface at the other, the links being set at an angle to the vertical so as to produce an upward movement of the table when the latter is moved in the direction the material is to be advanced, and a downward movement when the table is moved in the opposite direction by a simple form of head motion.

We have discovered that, if granular or divided material, fed on an inclined table to which a differential reciprocating and rising and falling motion, as just described, is imparted, so as to impart to the material projecting pulsations in a forward and upward direction, encounters in its travel across said surface an incline or up-grade located in and extending across said surface, or transversely to the direction of travel of said material, all pieces or particles of said material up to a certain bulk or volume, depending upon the incline of the grade encountered, will be diverted from their natural line of travel over the surface, to a course parallel to the incline encountered, while to all pieces or particles of a less volume or bulk, the said incline or grade will offer practically no resistance, and they will pass over said incline or grade and continue to progress under the influence of the reciprocating movement imparted to the inclined surface or table, until they encounter another obstructing incline of sufficient pitch to divert them from their horizontal line of travel. A simple form of apparatus involving the application of this principle is exemplified in Fig. 4 which consists of a table, A having thereon a series of transverse rib-like members F, each consisting of an upwardly inclined face $f$ terminating in a vertical wall $f'$, the pitch or inclination of the faces $f$ of the successive rib-like members increasing toward the right-hand end of the table A so that the ribs or deflectors F successively increase in pitch or inclination, the one of lowest pitch being nearest the feed end of the table, while the one of greatest pitch is at the opposite end of the table. Material of varying sizes fed at the upper left hand corner of the table A in Fig. 4, will first assume the several courses, according to the size of the particles, as indicated in Fig. 2, but when a rib or deflector F having a grade of sufficient pitch is reached, to obstruct the passage of the largest particles or pieces of the material, the said largest particles are arrested in their forward course and diverted to a course parallel to the arresting rib or deflector F. By successively increasing the pitch or inclination of the ribs or deflectors, it will be apparent that each will selectively arrest and divert pieces or particles of a given size to cause the same to be discharged from its lower end, as exemplified in Fig. 4, in which 1 to 11 indicates particles, gradually decreasing in size, which are discharged from the successive inclines or deflectors. This effect is produced by balancing the force of gravity with the progressive or propelling force acting upon the particles or pieces of material passing over the table.

The phenomenon is exemplified diagrammatically in Fig. 3, in which $x$ represents a given particle which is successively applied to four planes, 1, 2, 3, 4. Assume the force of gravity acting upon said particle, in the direction indicated by arrow Z to be 40, and a progressive or forwardly propelling force acting in the direction of the arrow Y, to be 20. To a particle on plane 1, the effect of gravity upon the particle $x$ would be indicated by the friction between the particle and the plane, while the progressive force would be 20 minus said element of friction. If the plane be tilted in the successive positions represented by 2, 3 and 4, the component of gravity acting on the body $x$ resting on said plane, will be increased in proportion to the inclination of the plane. Assume that the component of gravity acting on the particle while the planes are in a position 2 and 3 to be 10 and 15 respectively, while the progressive force is still 20, it will be evident that the particle will be controlled by the progressive force and the body would be driven forward off of the plane. When the inclination of the plane, however, reaches position 4, where the value of the gravity component equals 20 and therefore balances that of the progressive force, the body will remain stationary on the plane, and any diminution of the progressive force or any increase of the inclination of the plane will cause the body to slide down the plane. It will be noted, therefore, that a distinct line of demarcation or separation is effected by the plane at inclination 4 between particles larger than $x$ and particles smaller than $x$. All particles larger than $x$ would be controlled by the preponderant value of gravity and would move down the plane 4, while all particles smaller than $x$ would be subjected to the preponderance of the projecting or propulsive force and would pass over and beyond the inclination 4. From the foregoing, it is obvious that a larger particle would require less inclination of the plane on which it rests to balance the two forces, namely propulsion and gravity, and a smaller particle will require a greater inclination of the plane to effect the balance of the forces aforesaid.

The application of the foregoing principles, exemplified in the laterally inclined table to which there is imparted a differential reciprocating motion associated with an upward movement in the forward or working stroke of the table to apply projecting pulsations in a forward and upward direction to the materials, said table being provided on its surface with a series of transverse deflectors having progressively increasing inclinations, produces a selective action on the material governed by the volume or bulk of the individual elements or particles of the material irrespective of the specific gravity thereof, and it will be apparent that if the several principles be so applied and the apparatus so constructed and arranged as to prevent or overcome the interference or entanglement of the pieces or particles of varying size, an absolute and final volumetric separation and sizing will be possible and commercially feasible. The first principle enunciated, to wit, that large particles travel down the inclined surface of the table faster than the smaller particles, may be applied to best advantage to effect a rough separation, which is rendered effective by imparting a differential reciprocatory motion to the table, so that all of the particles travel forward as well as downward over the table. A more definite and pronounced separation will result from the application of the third principle of action, to wit, the projecting pulsations delivered to the particles by giving the table a slight upward movement simultaneously with its forward movement, which has the effect of causing the coarse material to report at the top of the mass and the fine material at the bottom, with the intermediate products in between. This last action eliminates in a measure the tendency of the various sized products to become entangled. The application of the fourth principle, to wit, the interposition of the deflectors of successively increasing inclination, in the path of the particles will arrest the successive particles, according to their respective sizes, in their courses over the table and divert them toward the ultimate points of discharge, such arresting being effected by the balancing of the component of gravity on the respective particles with the progressive or propulsive force, by the interposition of the inclined surfaces of the deflectors running transversely of the table. The first rough separation of the material should be allowed to continue until the separation is sufficient to enable the other separating operations to take up and complete the sizing. When this point is reached, to wit, the rough sizing, the first principle should become practically inoperative, and all further separation or sizing should be effected by the other agents or operations.

To eliminate the first principle of operation after the preliminary rough sizing has been effected, and to admit of a more direct application of the projecting pulsations applied by the table to the material, the inclined surfaces of the deflectors are provided with generally transverse corrugations or ridges which introduce the final principle of the mechanical sizing operation. These corrugations or ridges may be given various forms and shapes and relative arrangement, as will be hereinafter more particularly described. The particular functions of the corrugations or ridges are manifold, but they coact with the other elements hereinbefore set forth to effect the ultimate separation of the material on the table strictly according to the size or volume of the elements thereof. Primarily, they provide a positive means for eliminating or suspending the action of the first principle, to wit, the differential movement of the material down the inclined table according to the size of the elements thereof, after the roughing operation is completed. For an explanation of this principle, reference is made to Fig. 5, which is a diagram of the corrugations or ridges G, applied to the inclined surface of a deflector F, the said corrugations or ridges having a general cross section of an isosceles triangle and gradually increasing in height from the upper or feed end O of the deflector F to the lower or discharge end of the same. Assume that four particles $x$, $y$, $x'$, $y'$ have been delivered to the corrugated surface of said deflector as shown, that the lines $s$, $t$, $s'$, $t'$ represent the direction of the component of gravity acting upon the several particles and therefore pass through the centers of gravity of the said particles; it is obvious that so long as the center of gravity of a given particle falls to the right of the apex of the corrugation against which the particular particle is lodged, the said particle can not pass over the obstructing corrugation, but on the contrary, if the center of gravity of a given particle falls to the left of the apex of the interposed corrugation, the movement of the particle will not be arrested by the said corrugation, but will be continued until a corrugation is reached, on which the particle will lodge in a position in which its center of gravity lies to the right of the apex. By reference to Fig. 5, it will be apparent that the particle $x$ will be restrained in its downward movement between the first and second ridges or corrugations, while the particle $y$ will pass over the second corrugation and find lodgment against the first corrugation, whose apex is sufficiently high to prevent the center of gravity $y$ extending over the same. Similarly, the particle $y'$ will be restrained by the last ridge or corrugation in the series, for the reason that its center of gravity falls to the right or inside a vertical line through the apex of the last corrugation, while the particle $x'$, whose center of gravity lies in the vertical line $s'$, will not be restrained by the corrugation, and said particle $x'$ will pass over the same. By employing corrugations or ridges of gradually increasing height, as indicated in Fig. 5, the elimination of the first principle, to wit, the sliding movement of the elements of the mass down the inclined plane, is likewise gradual, beginning by eliminating the effect aforesaid upon the fine material and gradually increasing to the coarse. In operating upon some classes of material, it may be desirable to employ corrugations of the same size from top to bottom of the deflectors, in which case, if the corrugations are of such dimensions as to bring the centers of gravity of all the particles to the right of the apexes of the corrugations or ridges, the time required to complete the elimination of the sliding of the particles down the deflector will depend upon the amount of material the corrugations are capable of holding.

A further very important function or effect of the corrugations or ridges is that they admit of a direct and continued application of the principle of stratification of material *en masse* with the finer material reporting at the bottom and the coarser material at the top, when the material is subjected to a vertical shaking motion such as is given to the table at the same time it is reciprocated. It is evident that if a perfectly smooth surface on the table or on the deflectors F were employed, this principle of vertical stratification or sizing would be applicable only in the near vicinity of the point of feeding the material where the latter is in considerable mass, and before it has had time to spread out in a thin sheet with practically all of the individual pieces or particles resting directly upon the separating surface. Again, if a smooth surface were employed, having the necessary lateral inclination, instead of the material receiving the full effect of the vertical movement of the table, thereby causing the said material to be projected in a generally vertical direction, there would be a tendency for the material to slide directly down over the table surface, thereby in a degree nullifying the effect of the vertical motion.

The corrugations or ridges G are so placed on the deflectors as to form pockets between them, into which the material from the preceding deflector is discharged, where said material is held *en masse* while being further subjected to the sizing or stratifying action due to the vertical movement imparted to the table, after which the said material is discharged either into the succeeding pocket on the next deflector, or into the pocket below it on the same deflector. This action is exemplified in the enlarged fragmentary section of the table illustrated in Fig. 7, which shows portions of two adjacent deflectors F, the inclined surfaces $f$ of which are provided with ridges or corrugations G. The adjacent inclined surfaces of the two lowermost ridges or corrugations G on the first deflector F form a V-shaped pocket, defined by the lines 1, 2, 3, 4, 5, 6. The line $y''$—$y''$ represents the plane of the mean level of the material held in the pocket between the two corrugations aforesaid. It will be noted that the relation of the corrugations to the surface of the deflector F is such that a portion of the edge 1, 2, to wit, a distance from 1 to 7 lies below the plane $y''$, $y''$, so that the portion of the edge 1 to 7 provides a spillway for the material at the top of the mass into the next adjacent pocket below, which latter has been omitted to avoid complication. The material at the bottom of the mass, however, cannot pass over this spillway, but is permitted to escape from the pocket through another spillway defined by the open end of the pocket, 2, 5, 4, through which the material at the top of the mass cannot pass, because of the longitudinal inclination of the plane 1, 2, 5, 6, which inclination, of course, is longitudinally the same as that of the upper surface $f$ of deflector F. When the projecting pulsations, due to the differential motion of the table, are imparted to the material in the pocket aforesaid, the coarser particles or elements report at the top of the mass and pass over the spillway 1 to 7 to the next pocket below on the same deflector, where the operation is repeated, while the finer particles report at the bottom of the mass and are carried over the spillway 2, 5, 4 into the pocket on the succeeding deflector, where it is again subjected to the same action.

From the foregoing, it will be seen that the portion of the inclined surface of the lowermost ridge or corrugation G, defined by the lines 7—2, 2—8, and 8—7 effects the division between the elements or particles of the material, all particles as large or larger than $x'$ passing over the corrugation or ridge between the points 1 and 7, while all particles $y$, $z$ smaller than $x'$ pass into the adjacent pocket on the succeeding deflector.

It will be observed that the plane defined by the face, 1, 2, 5, 6, of the lowermost corrugation or rib G likewise has a longitudinal inclination equal to that of the surface $f$ of the deflector F, so that the principle of operation of the said inclined surface $f$ applies directly to the material in the pocket between the ridges or corrugations. To illustrate; to a particle $x'$ the longitudinal inclination of the plane, 1, 2, 5, 6, is sufficient to more than balance the component of the force of gravity with the progressive force, therefore all particles as large or larger than particle $x'$, occupying the pocket will be controlled by gravity, and although such a particle, as $x'$, be carried forward in the pocket, it will, upon reaching that portion of the plane defined by the points, 2, 7, 8, be brought under the influence of the predominating force and returned down the pocket, to be discharged with the other particles of the same or larger size. On the other hand, in so far as the particles $y$ and $z$ are concerned, the longitudinal inclination of the plane, 1, 2, 5, 6, is not sufficient to balance the force of gravity with the progressive force aforesaid, and the said particles are, therefore, controlled by the latter force and are carried forward over the spillway, 2, 5, 4, into the succeeding pocket on the next deflector F, and so on, until a plane of sufficient inclination, defined by the pitch of the top surface $f$ of a deflector F, is encountered that will cause the particles to be discharged over the respective spillways corresponding to spillway defined by the line 1—7, which spillways will, of course, be located upon the ridges or corrugations of the respective restraining deflectors F.

Inasmuch as the inclination of the deflectors F increases progressively, that is to say, the pitch of the top surface $f$ of each deflector is greater than that of the next preceding deflector, it will be apparent that the longitudinal inclination of each plane of corrugation or ridge G, corresponding to plane, 1, 2, 5, 6, will progressively increase on the successive deflectors. As the inclination of the plane, 1, 2, 5, 6, in a longitudinal direction, is upward, a particle traveling over this plane, or the corresponding plane in any other ridge or corrugation G will be discharged from the deflector at a point higher up than that at which the said particle began its course over said deflector. Thus a particle $z$ traveling from a point 6 to a point 5, at which it is discharged from said deflector to the next succeeding deflector, has traveled in its course across said deflector, a distance up on said deflector equal to 5—10. This inclination progressively increases on the successive deflectors, thus enabling a fine particle which may have been carried down out of its normal zone by entanglement or other influences, to gradually work back up on the deck or table surface as it is carried forward until it finally reaches its proper point of discharge, which will be defined by the deflector F over which it will not be carried by the projecting or propelling force imparted to the table. From the foregoing, it will be apparent that while the arrangement, general proportions and relations of the corrugations or ridges on the individual deflectors or on successive deflectors may vary, to meet the requirements of different industries, they nevertheless, in each case, provide a very effective means for applying and eliminating the different principles of operation involved in the process of sizing the mass of material, according to the volume of the different elements. An effective arrangement of the deflectors and of the angular disposition of the ridges or corrugations thereon, with respect to the deck, is illustrated in Fig. 8, in which A indicates the deck or table having thereon deflectors numbered 1 to 17 inclusive, the longitudinal lines of which radiate from a common center O, which renders it possible to employ deflectors of uniform height and substantially uniform width, but of progressively increasing inclination. The longitudinal lines defining the corrugations G also radiate from the common centers O' to O¹⁷ inclusive, all of the lines defining the ridges or corrugations on deflector No. 1 radiating from the center O', and all of the ridges or corrugations on deflector F being defined by lines radiating from center O⁹, and so on. This construction makes the inclination of the planes corresponding to 1, 2, 5, 6, in Fig. progressively increase for each succeeding deflector, and also produces a progressive increasing inclination of the said plane on each ridge or deflector from the bottom to the top of each individual deflector. In the diagram in Fig. 8, it will be noted that but one line of the extreme upper and lower ridges or corrugations for any given deflector is indicated to avoid confusion, but it will be understood, of course, that the longitudinal lines for all of the ridges or corrugations for a given deflector are drawn from the same common center, therefore, the same broad and general disposition of ridges or corrugations will be found upon each of the deflectors, and in order to provide the increasing inclination of the ridges or corrugations, not only on the individual deflectors, but on successive deflectors, the centers from which the longitudinal defining lines of the ridges or corrugations on successive deflectors are struck, change from O' to O$^{17}$, upon an arc struck from O as a center.

In Fig. 6, there is illustrated a separating deck or table provided with deflectors F, each having on its surface corrugations G, both the deflectors and corrugations being laid down and defined according to the method just described and illustrated in Fig. 8, the radiating lines for some of the deflectors and some of the corrugations being indicated. If the deck or table illustrated in Fig. 6 have imparted to it a longitudinal reciprocation combined with the rocking motion to cause it to rise slightly during the forward motion to impart the described projecting impulses to the pieces or particles of material fed en masse to the table at a point marked W, the material will be subjected to the action of the various principles of operation hereinbefore enumerated, and effective separation of the elements of the mass according to their respective sizes will be accomplished. A coarse particle fed to the table at W would take a course W to X if it should encounter no interfering element, such as the inclined surfaces of the deflector and the corrugations thereon, but said coarse particle upon encountering the inclined surface of the first deflector with the corrugations G thereon is diverted from its normal course to one parallel to the incline encountered, represented by W—X', for the reason that the impulses imparted to said particle are insufficient to carry them over the first deflector. For a smaller particle, the natural course across the separate surface would be W—Y, but upon encountering a grade of a deflector of sufficient inclination to arrest the forward course, the said particle is diverted to a course W—Y', the latter portion of which is parallel with said deflector. Should this particle, by reason of entanglement with the material en masse, be carried out of its natural line of travel, as indicated by line W—Y$^2$, it will, upon encountering the deflector having the necessary inclination, be diverted to its proper point of discharge at Y', regardless of the fact that the inclined surface which caused it to change its course was higher up on the deck than in the case of the same sized particle following the normal course W—Y'. The natural line of travel of the finest material would be that indicated by the line W—Z, but, owing to the progressively increasing inclination of each succeeding deflector and corrugation, the finest particles are caused to take a course almost straight across the deck, as indicated at W—Z'. Should it occur that a fine particle is carried down any of the first series of deflectors because of entanglement, as soon as it is freed by the selective action of the deflectors and corrugations, it will assume a course represented by the line W—Z$^2$ and be discharged with all of the other finest particles. Thus it is evident that the apparatus as described affords ample opportunity for all pieces or particles which may be carried out of their proper zone or course by entanglement to work back to the proper zone before the final point of discharge is reached.

Figs. 9 to 11 of the drawings illustrate a commercial form of table involving the principles hereinbefore set forth, and adapted to carry out the sizing process defined. Referring to said figures, A indicates the separating deck or table comprising a top $a$ supported by longitudinal ribs $a'$ and end ribs $a^2$, all of which may be constructed of either wood or metal of appropriate size and shape, as the conditions of operation may indicate, the whole being constructed and arranged to provide a strong, rigid structure preferably free from any vibration or movement other than that intentionally applied thereto by the operating apparatus. In order to increase the rigidity of the structure, it may be strengthened by means of tie rods $a^5$ passing through the outer longitudinal ribs $a'$ and intermediate lugs or cleats $a^4$ fastened to the under surface of the top $a$, said rods being provided with adjusting nuts or turn buckles $a^6$.

To the under surface of the top $a$, and preferably at or adjacent the longitudinal ribs $a'$ are secured pendant brackets $b$, which in turn are connected by links B to pedestals or brackets $b'$ rigidly secured to a base or foundation C, which latter may be of any appropriate form. The relation of the respective links and brackets on opposite sides of the table is such as to cause any lateral inclination of the table, found desirable, according to the character of the material to be operated upon. It will be understood that the inclination of the table is in a direction substantially transverse to that of its reciprocatory movement. The function of the links B is to impart a relatively small upward movement of the table during the forward half of its reciprocation, and a corresponding downward movement during the return movement of the table, the two movements, namely reciprocation and rocking producing the projecting pulsations necessary to be imparted to the different elements of the material to be separated.

The desired motion is imparted to the table by means of any suitable head motion, such as employed in concentrator tables and the like, and an effective form of such head motion is illustrated in detail in Fig. 11. This head motion D comprises a base $d$, in which there is journaled a crank shaft $d^2$ carrying driving pulleys $d'$. Mounted on the cranked portion of the shaft $d^2$ is a pendant lever $d^3$ which is connected at its lower end to toggle links $d^4$, one of which is pivotally connected to a reciprocating frame $d^5$, which latter is provided at its front and rear ends with guide rods $d^6$ sliding in bearing blocks $d^7$ mounted upon the bed plate of the frame $d$. The other toggle link $d^4$ is pivoted to a vertically adjustable bracket $d^9$, which can be adjusted up and down with respect to the bed plate by means of a screw $d^{10}$. The rotation of the shaft $d^2$ causes a vertical oscillation of the lever $d^3$, which through the toggle links $d^4$ is transmitted as a reciprocatory motion of the frame $d^5$. The latter is connected by its rearward guide rod $d^6$, by a swivel connection $d^{11}$, to a reciprocating rod $d^{12}$, which at its rearward end is connected to yokes $d^{13}$, which latter are connected to the under side of the separating deck at approximately the center thereof.

By means of the foregoing arrangement, the rotation of the crank shaft $d^2$ imparts rapid reciprocation to the frame $d^5$, which latter with the connecting rod $d^{12}$ imparts a corresponding reciprocating motion to the deck or table A, and inasmuch as the latter is supported by the links B, which links have a normal inclination toward the head motion D, will impart to the table or deck, simultaneously with its reciprocating motion, a rising and falling motion, the rising motion being limited to the first half or forward portion of the reciprocation of the table, while the falling motion transpires during the return half of the reciprocation.

The head motion D is preferably placed at an angle to the bed C, so as to bring its longitudinal axis to a line substantially tangent to the arcs described by the links B at a point midway of their travel. In order to cushion and steady the table or deck in its return movement, there are provided on each side of the table rods, $h$ which are pivotally connected to the brackets $b$, and at their lower ends pass through and have a free sliding movement in guide brackets $h^2$ mounted upon the bed C. Cushioning springs $h'$ are mounted upon said rods, which latter are provided with adjusting nuts $h^3$ to regulate the tension on the said springs. A similar cushioning effect may be applied directly to the head motion by interposing a cushioning spring $d^{14}$ between a pendant arm $d^{16}$ of the frame $d^5$ and an abutment on an adjusting rod $d^{15}$ mounted in the base plate of the head motion, and passing through the pendant arm $d^{16}$.

The material to be graded or sized is fed to the upper corner of the table or deck adjacent the head motion by means of a spout or other feed device E, and is immediately subjected to the projecting pulsations imparted to the table, and to the separating effects or operations predicated upon the lateral inclination of the table, the inclined deflectors on the table and the ridges or corrugations on the deflectors as hereinbefore described, to the effect that the material is graded or sized strictly according to the volumes of the pieces or particles forming the mass. All particles of a given size or volume, irrespective of the differences of specific gravity thereof, are discharged from the foot of a given deflector, or, in the case of the finest material, are discharged over the rearward lateral edge of the table.

In the particular form of apparatus illustrated in Figs. 9 to 11, the deflectors F are shown of substantially uniform width along their base lines, but of progressively increasing inclination so that the deflectors nearest the feed or head motion end of the table are the lowest and those at the rear end of the table are highest.

As illustrated in Fig. 9, the ridges or corrugations G on the deflectors are of substantially the same height throughout the length of each deflector, but, as hereinbefore indicated, the ridges or corrugations on a given deflector may progressively increase in height from the top edge to the bottom edge of the table, and similarly, if found desirable, the ridges or corrugations on successive deflectors may decrease in height. In all cases, however, the corrugations are so disposed as to form a series of pockets running substantially transverse to the length of the deflectors. These ridges or corrugations may be formed on the individual deflectors by facing the latter with sheets of rubber or the like on which the corrugations of appropriate shape and size are formed, or the said ridges or corrugations may be worked directly into the material of the deflectors by suitable channeling or routing tools. In fact, the entire deck surface, or the individual deflectors may be made by pressing, casting, or molding to the desired form, if it is found preferably to construct the deck of metal. In short, the deck or table and its associated deflectors and corrugations may be constructed of any suitable form or material, and in any way appropriate to the purposes for which it is designed.

In Figs. 12, 13 and 14, there is illustrated a modified form of sizing machine, in which there are two separating decks or surfaces, the general configuration of the table being that of a hipped roof with two sides sloping from a central ridge. The structure of the table considered as a whole differs from that hereinbefore described only in its form and the disposition and arrangement of the several series of deflectors and corrugations or ridges on the respective separating surfaces. The roof-shaped table is mounted upon links B supported from the base C, as hereinbefore described, but, of course, the links are all of the same size, for the reason that the two inclined sides of the table are symmetrical with respect to the longitudinal axis of the apparatus. The head motion is connected, as in Figs. 9 to 11, by means of a connecting rod $d^{12}$ to a point under the center of the compound table, and the cushioning devices are disposed substantially as in the apparatus hereinbefore described, four of said cushioning devices being employed, two on each side of the table.

Each lateral deck of the table is divided into two sizing surfaces, and the corresponding sizing surfaces on opposite sides of the deck or table A' are fed from a common distributer $i$ or $i'$ the distributer $i$ at the front end of the table being of hipped form and having its surfaces provided with corrugations or ridges formed as continuations of the ridges on the first deflector F, but having no inclination in the direction of the length of the table. The rearward distributer or feed section $i'$ is of similar form, but is elevated to extend over the rearward deflector of the first separating sections. A transverse batten $t$ which runs across the table in both directions serves to divide the adjacent separating sections and also to support the distributer $i'$. The purpose of providing the feed sections $i$ and $i'$ with corrugations or ridges corresponding to the corrugations on the first deflectors F is to enable the material to spread out over the surface of the distributers before encountering the incline of the respective first deflectors. It will be understood, of course, that the material is fed to the respective distributers $i$, $i'$ from spouts or chutes located directly over the ridge-like portion of the table so that the material flows in both directions and is delivered to the four sections of the table.

Each section of the table is provided with deflectors F having thereon corrugations or ridges G, as hereinbefore described. The several deflectors are of successively increasing inclination from the head motion end of the table to the rear end of the same and upon the inclined faces of the respective deflectors F, there are provided the corrugations or ridges G which decrease in size on the successive deflectors, which corrugations or ridges also increase in pitch or inclination from the bottom to the top of each separate deflector, as indicated by the lines on the inclined surfaces of the deflectors. The deflectors and also the corrugations or ridges thereon, in this form of the apparatus, are laid out according to the principle illustrated in Figs. 6 and 8.

At the foot of each deflector the deck or table is provided with chutes or runways S which serve to collect the sized materials discharged from the respective deflectors and to deliver the same to appropriate receptacles.

In Fig. 15, there is illustrated another arrangement of table consisting of two hipped or roof-shaped decks in superposed relation, so that when the material is fed to distributers similar to those illustrated in Figs. 12 and 13, said material will be operated upon by one of either four or eight separating sections according to the length of the table. In other words, the modification shown in Fig. 15 may involve a duplication of the table shown in Fig. 12, one superposed above and separated from the other, or in the alternative, the arrangement may involve two separating sections on each deck A', A'', one separating section only being located on the respective inclines. The superposed decks may be spaced from each other and held rigidly in the desired relation by means of straps or bars $A^2$, as indicated.

In all the forms of apparatus disclosed, when the mixed material is fed to the separating surfaces of the deck or table, the coarsest material is the first to encounter a deflector to divert it from a forward to a downward course, while the next coarser material passes over this deflector; but upon encountering a deflector of sufficient inclination, it in turn is diverted to a downward course and so on, throughout the regular orderly operation of the apparatus and the application of the process hereinbefore particularly described, until all of the material has been positively and definitely separated, collected and discharged from the apparatus strictly according to the size of the individual elements or particles of the mass. It will be understood, of course, that all oversized pieces of the material, which are too large for the table to handle, are passed directly down the incline parallel with the first deflector.

What we claim is:—

1. The method of sizing solid materials, which consists in imparting motion thereto by the conjoint action of the force of gravity and projecting pulsations applied to the unsized material at an angle to the direction of the force of gravity, progressively diminishing the effect of the projecting pulsations, simultaneously and progressively increasing the effect of the force of gravity, and separately collecting the different sizes.

2. The method of sizing solid materials, which consists in subjecting the unsized material to the action of gravity while supported upon an inclined surface, imparting projecting pulsations to the material which act at an angle to the direction of the force of gravity, progressively diminishing the effect of the projecting pulsations, simultaneously and progressively increasing the effect of the force of gravity, and separately collecting the different sizes.

3. The method of sizing solid materials supported upon a laterally inclined surface, which consists in imparting to the unsized materials projecting pulsations to advance and lift the same, and simultaneously interposing successively increasing resistance to the movement of the material due to said pulsations and to the force of gravity respectively, and separately collecting the different sizes.

4. The method of sizing solid materials upon a laterally inclined surface, which consists in feeding the unsized material to said surface, imparting projecting pulsations to said material to intermittently advance and lift the same, interposing successively increasing resistance substantially at right angles to the direction of movement of the material due to said pulsations, simultaneously interposing successively increasing resistance to the movement of the material due to gravity, and separately collecting the different sizes.

5. The method of sizing solid materials upon an inclined surface, which consists in feeding unsized material to said surface, imparting projecting pulsations to said material to intermittently advance and lift the same, and simultaneously, progressively changing the ratio of the component of gravity to that of the projectile force, to correspond to successively decreasing volume values, and separately collecting the different sizes.

6. In a machine for sizing solid materials, means for supporting the unsized material, means for imparting projecting pulsations to such material to lift and advance the same with respect to the supporting means, means for interposing progressively increasing resistance to the advance movement of the material, and means for separately discharging the different sizes from the machine.

7. In a machine for sizing solid materials, means for supporting the material, means for imparting projecting pulsations to such material to lift and advance the same with respect to the supporting means, and means for interposing progressively increasing resistance to the advance movement of the material comprising inclined surfaces, disposed transversely of said movement and having progressively increasing pitch or inclination.

8. In a machine for sizing solid materials, a separating deck, mechanism for imparting thereto simultaneous longitudinal and vertical reciprocations, and transversely extending deflectors on the upper surface of said deck, having inclined surfaces, the inclined surfaces of adjacent deflectors being of different pitch.

9. In a machine for sizing solid materials, a separating deck, mechanism for imparting thereto simultaneous longitudinal and vertical reciprocations, inclined transversely arranged deflectors on the upper surface of said deck, and corrugations or ridges on the inclined surfaces of said deflectors and extending transversely across the same.

10. In a machine for sizing solid materials, a separating deck having its surface laterally disposed at an angle to its direction of movement, mechanism for imparting thereto simultaneous, longitudinal and vertical reciprocations, transversely arranged deflectors having inclined surfaces located on the separating surface of said deck, and corrugations or ridges extending transversely across the inclined surfaces of the deflectors.

11. In a machine for sizing solid materials, a laterally inclined separating deck, mechanism for imparting thereto simultaneous longitudinal and vertical reciprocations, transversely extending deflectors having inclined surfaces, said inclined surfaces being of successively increasing pitch, and corrugations or ridges extending transversely across the inclined surfaces of the deflectors.

12. In a machine for sizing solid materials, a laterally inclined separating deck, mechanism for imparting thereto simultaneous longitudinal and vertical reciprocations, transversely extending deflectors having inclined surfaces, said inclined surfaces being of successively increasing pitch, and corrugations or ridges extending transversely across the inclined surfaces of the deflectors, the corrugations on each rib being of successively increasing pitch from the top to the bottom of the deflector.

13. In a machine for sizing solid materials, a laterally inclined separating deck, mechanism for imparting thereto simultaneous longitudinal and vertical reciprocations, transversely extending deflectors having inclined surfaces, said inclined surfaces being of successively increasing pitch, and corrugations or ridges extending transversely across the inclined surfaces of the deflectors, the corrugations or ridges decreasing in size on the successive deflectors.

14. An apparatus for sizing solid materials, comprising means for imparting to a mass of unsized material projecting pulsations for advancing the material, means for simultaneously and incrementally resisting the advance movement of the material due to said projecting pulsations and to the action of gravity respectively, and means for separately discharging the different sizes from the machine.

In testimony whereof we affix our signatures, in presence of two witnesses.

CHARLES L. McKESSON.
BENJAMIN F. RICE.

Witnesses:
H. M. MASON,
W. E. SMITH.